(12) United States Patent
Shigabutdinov

(10) Patent No.: US 11,868,634 B2
(45) Date of Patent: *Jan. 9, 2024

(54) SYSTEMS AND METHODS FOR FILE MANAGEMENT BY MOBILE COMPUTING DEVICES

(71) Applicant: Ruslan Shigabutdinov, Kazan (RU)

(72) Inventor: Ruslan Shigabutdinov, Kazan (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,003

(22) Filed: Nov. 22, 2022

(65) Prior Publication Data

US 2023/0085586 A1     Mar. 16, 2023

Related U.S. Application Data

(63) Continuation of application No. 17/236,334, filed on Apr. 21, 2021, now Pat. No. 11,520,511, which is a
(Continued)

(51) Int. Cl.
*G06F 16/00*     (2019.01)
*G06F 3/06*      (2006.01)
(Continued)

(52) U.S. Cl.
CPC ......... *G06F 3/0643* (2013.01); *G06F 3/0605* (2013.01); *G06F 3/067* (2013.01);
(Continued)

(58) Field of Classification Search
CPC .... G06F 3/0643; G06F 3/0605; G06F 3/0608; G06F 3/0652; G06F 3/067; G06F 3/0679;
(Continued)

(56) References Cited

U.S. PATENT DOCUMENTS

2002/0007417 A1   1/2002  Taylor
2005/0091095 A1   4/2005  Wilbrink
(Continued)

FOREIGN PATENT DOCUMENTS

CN       1822004 A    8/2006
CN     101771817 A    7/2010
(Continued)

OTHER PUBLICATIONS

EP Search Report for European Patent Application No. 13/882165. 7, dated Apr. 25, 2016, 8 pages.
(Continued)

*Primary Examiner* — Dinku W Gebresenbet
(74) *Attorney, Agent, or Firm* — Lowenstein Sandler LLP

(57) ABSTRACT

Systems and methods for file management by mobile computing devices. An example method, performed by a computer system, may comprise: storing, by a computer system, a first file having a first size, in a memory; storing, in the memory, a second file derived from the first file, the second file having the second size, the second size being less than the first size; determining that the memory is not sufficient to perform a memory write operation; selecting a third file having a fourth file associated with it, the fourth file derived from the third file; and removing the third file from the memory.

20 Claims, 8 Drawing Sheets

Related U.S. Application Data continuation of application No. 14/784,872, filed as application No. PCT/RU2013/000332 on Apr. 18, 2013, now Pat. No. 11,023,151.

(51) Int. Cl.
  *G06F 16/93* (2019.01)
  *G06F 16/182* (2019.01)
  *G06F 16/17* (2019.01)
  *G06F 16/16* (2019.01)

(52) U.S. Cl.
  CPC .......... *G06F 3/0608* (2013.01); *G06F 3/0652* (2013.01); *G06F 3/0679* (2013.01); *G06F 16/162* (2019.01); *G06F 16/1727* (2019.01); *G06F 16/182* (2019.01); *G06F 16/93* (2019.01)

(58) Field of Classification Search
  CPC .. G06F 16/162; G06F 16/1727; G06F 16/182; G06F 16/93
  See application file for complete search history.

(56) References Cited

U.S. PATENT DOCUMENTS

| | | | |
|---|---|---|---|
| 2005/0097126 A1 | 5/2005 | Cabrera | |
| 2005/0257023 A1 | 11/2005 | Peng | |
| 2006/0031326 A1 | 2/2006 | Ovenden | |
| 2006/0039256 A1 | 2/2006 | Nakamura | |
| 2006/0279628 A1 | 12/2006 | Fleming | |
| 2006/0288044 A1* | 12/2006 | Kashiwagi | G11B 27/036 |
| 2007/0130199 A1 | 6/2007 | Yoshida | |
| 2008/0086491 A1 | 4/2008 | Wang | |
| 2008/0198177 A1 | 8/2008 | Niemi | |
| 2008/0250024 A1 | 10/2008 | Kvm | |
| 2009/0027702 A1 | 1/2009 | Sakai | |
| 2009/0162030 A1 | 6/2009 | Kogusuri | |
| 2010/0103779 A1 | 4/2010 | Kakirde | |
| 2011/0113205 A1* | 5/2011 | Garcia Puga | G06F 3/0605 711/E12.001 |
| 2011/0119461 A1 | 5/2011 | Desai | |
| 2011/0252102 A1 | 10/2011 | Kim | |
| 2011/0307797 A1 | 12/2011 | Imamichi | |
| 2012/0317219 A1 | 12/2012 | Carroll | |
| 2013/0262386 A1* | 10/2013 | Kottomtharayil | G06F 1/3234 707/635 |

FOREIGN PATENT DOCUMENTS

| | | | |
|---|---|---|---|
| JP | 2000148560 A | 5/2000 | |
| JP | 2002209131 A | 7/2002 | |
| JP | 2003122774 A | 4/2003 | |
| JP | 2004194130 A | 7/2004 | |
| JP | 200385008 A | 10/2004 | |
| JP | 2005173949 A | 6/2005 | |
| JP | 2006060630 A | 3/2006 | |
| JP | 2007281772 A | 10/2007 | |
| JP | 2007281775 A | 10/2007 | |
| JP | 2007323378 A | 12/2007 | |
| JP | 2009536482 A | 10/2009 | |
| JP | 2011257990 A | 12/2011 | |
| KR | 1020090065107 A | 6/2009 | |
| KR | 1020120018965 A | 3/2012 | |
| RU | 2344496 C2 | 1/2009 | |
| WO | 2009016347 A1 | 2/2009 | |
| WO | 2017129081 A1 | 8/2017 | |

OTHER PUBLICATIONS

EP Communication pursuant to Article 94(3) EPC for Application No. 13882165.7-1231, dated Sep. 25, 2018, 2 pages.
Annex to Communication under Art.94(3) EPC—Preliminary Opinion of the Examination division for Application No. 13882165.7, dated Sep. 25, 2018, 6 pages.
PCT Search Report for PCT Application No. PCT/RU2013/000332, dated Jan. 16, 2014, 8 pages.
International Application No. PCT/RU2013/000332, International Preliminary Report on Patentability dated Aug. 7, 2015.
International Application No. PCT/RU2013/000332, International Search Report, dated Jan. 30, 2014.
RU Search Report for Russian Patent Application No. 201514406, dated Mar. 6, 2017.
Decision on Grant for the Russian Application No. 2015144406/08(068398), dated Jun. 7, 2017, 7 pages.
Communication under Rule 71(3) EPC for EP Application No. EP 13882165.7, dated Aug. 8, 2019.
Notice of Reasons for Rejection for JP Application No. 2017-144264, dated Apr. 2, 2018, 8 pages.
Chinese Office Action for Chinese Patent Application No. 201380075772.5, dated May 9, 2018.
Chinese Office Action for Chinese Patent Application No. 201380075772.5, dated Feb. 20, 2019.
CN Decision of Rejection dated Oct. 11, 2019, 6 pages.
Brazil Office Action for Brazilian Patent Application No. 1120150261485, dated Jan. 27, 2020.
Brazilian Notice of Allowance for Brazilian Patent Application No. 1120150261485, dated Dec. 7, 2021.
CA Office Action for Canadian Patent Application No. 2909885, dated Dec. 11, 2018.
IN First Examination Report for Indian Patent Application No. 7033/CHENP/2015, dated Apr. 23, 2020.
KR Office Action for Korean Patent Application No. 10-215-7032428, dated Apr. 1, 2019.
KR Final Office Action for Korean Patent Application No. 10-2015-7032428, dated Oct. 31, 2019.
JPD Office Action for Japanese Patent Application No. 2018-219257, dated Dec. 23, 2019.
JPD Office Action for Japanese Patent Application No. 2018-219257, dated Jun. 22, 2020.
Decision to Grant for Japanese Patent Application No. 2018-219257, dated Jan. 7, 2021.

* cited by examiner

200 File access tracking data structure

| 210 File identifier | 212 File creation timestamp | 214 Access timestamp | 216 access operations counter |
|---|---|---|---|
| 210 File identifier | 212 File creation timestamp | 214 Access timestamp | 216 access operations counter |
| 210 File identifier | 212 File creation timestamp | 214 Access timestamp | 216 access operations counter |
| 210 File identifier | 212 File creation timestamp | 214 Access timestamp | 216 access operations counter |
| 210 File identifier | 212 File creation timestamp | 214 Access timestamp | 216 access operations counter |
| 210 File identifier | 212 File creation timestamp | 214 Access timestamp | 216 access operations counter |
| 210 File identifier | 212 File creation timestamp | 214 Access timestamp | 216 access operations counter |
| 210 File identifier | 212 File creation timestamp | 214 Access timestamp | 216 access operations counter |

FIG. 2

410 Calendar entry data structure

| 411 Type ID |
| --- |
| 412 Event ID |
| 414 Event Time |
| 416 Title |
| 418 Description |
| 420 Location |
| 422 Initiator |
| 424 Participants |
| 426 Recurring schedule |
| 428 Attachment |

440 Memorandum data structure

| 441 Type ID |
| --- |
| 442 Memorandum ID |
| 444 Creation/modification time |
| 446 Title |
| 448 Text |
| 450 Attachment |

FIG. 4

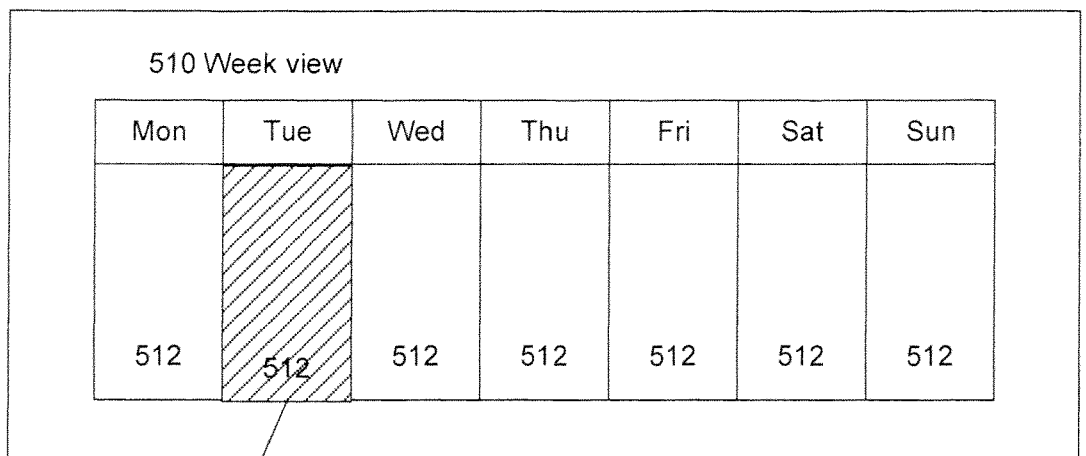
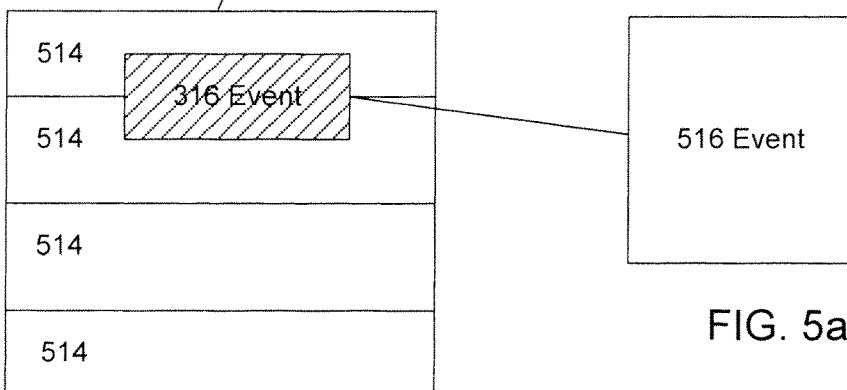
FIG. 5a
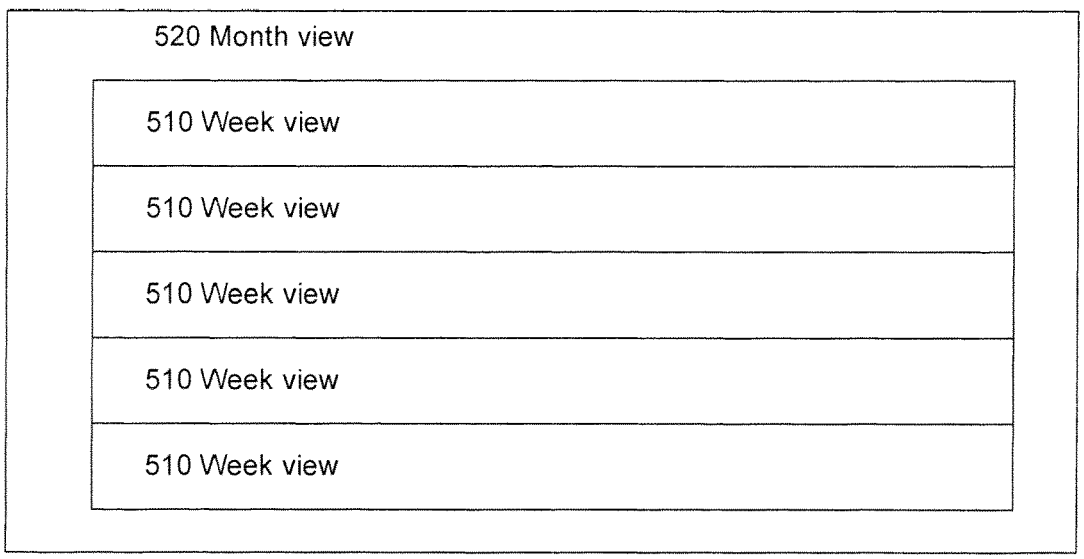
FIG. 5b

SYSTEMS AND METHODS FOR FILE MANAGEMENT BY MOBILE COMPUTING DEVICES

CROSS-REFERENCE TO RELATED APPLICATIONS

This application is a continuation of U.S. patent application Ser. No. 17/236,334 filed on Apr. 21, 2021, which is a continuation of U.S. patent application Ser. No. 14/784,872 filed on Oct. 15, 2015 and issued as U.S. Pat. No. 11,023,151 on Jun. 1, 2021, which is a national phase application filed under 35 U.S.C. § 371 of PCT/RU2013/000332, titled "Systems and Methods for File Management by Mobile Computing Devices," filed Apr. 18, 2013. The above-referenced applications are hereby incorporated by reference in their respective entireties.

TECHNICAL FIELD

The present disclosure is generally related to computer systems, and is more specifically related to systems and methods for file management by mobile computing devices.

BACKGROUND

A mobile computing device may have numerous input/output (I/O) interfaces and/or peripheral devices, such as, for example, a still image camera, a video camera, and/or a microphone. Files acquired by the mobile computing device via these and other I/O interfaces may be stored in the local memory of the mobile computing device.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates a data structure for tracking access to the files stored on the mobile computing device, in accordance with one or more aspects of the present disclosure;

FIG. 4 schematically illustrates several data structures supported by the computer system executing a calendar application in accordance with one or more aspects of the present disclosure;

FIGS. 5a-5b schematically illustrate examples of calendar views rendered by the computer system executing a calendar application in accordance with one or more aspects of the present disclosure;

DETAILED DESCRIPTION

Figure 1:
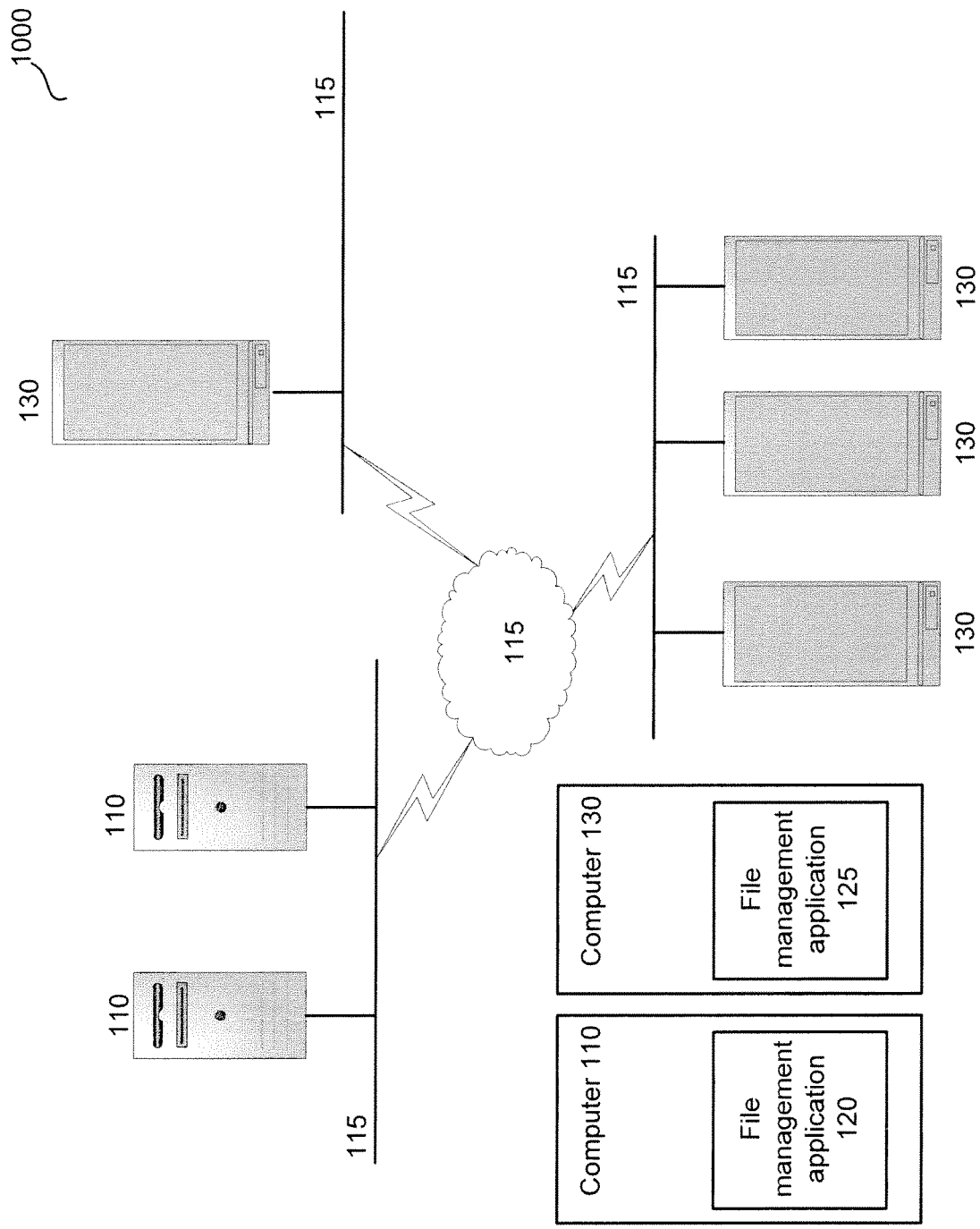
FIG. 1 depicts a network-level diagram of one illustrative embodiment of a mobile computing device performing the file management in accordance with one or more aspects of the present disclosure.

Described herein are methods and systems for file management by mobile computing devices. A "mobile computing device" herein shall refer to a portable device having at least one processor, a memory, and at least one communication interface. It should be noted, however, that systems and methods described herein may be equally applicable to non-portable computer systems, such as, e.g., desktop computers.

A mobile computing device may input information over a variety of interfaces, including, e.g., a keyboard, a touch screen, a network interface, a microphone, a video camera, a still image camera, and/or a microphone. Such a mobile computing device may be capable of inputting still image files, video stream files, audio stream files, and/or document files (e.g., text files).

In certain implementations, a mobile computing device may, responsive to acquiring a file (e.g., a still image file), store the acquired file in its local memory. "Memory" herein shall refer to the random access memory (RAM) and/or storage memory. The latter may be represented by one or more file systems residing in a non-volatile memory, such as EEPROM, flash memory, disk memory, etc.

Responsive to acquiring a file, the mobile computing device may also transmit, e.g., over a wireless communication interface, a copy of the acquired file to a file server. The mobile computing device may further store in the local memory a preview file derived from the acquired image file. The preview file may be, e.g., in a form of thumbnail image or other reduced size image, or a reduced resolution image.

The mobile computing device may further attempt a memory write operation (e.g., storing in a local file system a newly acquired image file). Should the space available in the local file system of the mobile computing device be insufficient to allow completion of the attempted memory write operation, the mobile computing device may select one or more previously acquired files for removal from the local file system, thus releasing the space necessary to store the newly acquired file. In one illustrative example, the mobile computing device may remove the least accessed, by the number of file access operations, file. In another example, the mobile computing device may remove the least recently accessed file. In a further example, the mobile computing device may remove the least recently acquired file.

Responsive to removing one or more selected files, the mobile computing device may complete the attempted memory write operation (e.g., storing a newly acquired image file in the local file system). Then, responsive to eventually receiving a user interface command requesting a file that has previously been removed from the local memory, the system may present the corresponding preview file. Responsive to receiving a user interface command explicitly directed to a full size file, the system may retrieve the full size file from the server on which the file has initially been stored.

Thus, the mobile computing device may store preview files for at least some of the files acquired by the mobile computing device, and may further store full size versions of the files for a subset of the acquired files, to the extent that the full size files may be accommodated in the file system of the mobile computing device. A full size file may be removed from the file system in order to accommodate a newly acquired file, and a preview file may be presented to a user responsive to a user interface command. The full size file may be retrieved from a file server responsive to receiving a user interface command which is explicitly directed to a full size file.

In certain implementations, the above described file management methods may be implemented to facilitate handling of file attachments by a calendar application executed by a mobile computing device. A "calendar application" herein shall refer to an application providing event scheduling and tracking for individual users and/or groups of users.

Various aspects of the above referenced systems and methods are described in details herein below by way of examples, rather than by way of limitation.

FIG. 1 depicts a network-level diagram of one illustrative embodiment of a computer system 1000 in accordance with one or more aspects of the present disclosure. The computer system 1000 may comprise one or more servers 110 executing server-side portions 120 of a file management application (e.g., a calendar application). One or more client computers 130 executing client-side portions 125 of the file management application may be connected to the server computer 110 over a plurality of interconnecting networks 115.

A "computer" herein shall refer to an apparatus including a processor, a memory, and at least one I/O interface. A computer may be represented, e.g., by a server, a virtual machine running on a host computer system, a portable or desktop personal computer (PC), a tablet computer, or a smartphone. Further, the term "computer" shall include any collection of computers that individually or jointly execute a set (or multiple sets) of instructions to perform any one or more of the methods described herein.

A "network" herein shall refer to a distributed communication system interconnecting two or more computers. A network may be represented, e.g., by a local area network (LAN), a wide area network (WAN), or a virtual private network (VPN). In certain implementations, the plurality of interconnecting networks 115 may include the Internet.

Functions of the computer system 1000 may be delivered to an end user via one or more client devices 130, such as, for example, a portable or desktop personal computer (PC), a tablet computer, or a smartphone. In one example, one or more client devices 130 may provide user interface functions and communicate to one or more servers 110 which may perform client request processing, load balancing, client authentication, authorization, file storage and retrieval, billing, and other functions. These and other functions may be distributed among one or more servers 110 residing in one or more physical facilities.

In another example, at least some of the above listed server-side functions may be performed by one or more client devices 130. In certain implementations, a client device 130 may perform at least a subset of its functions while not being connected to a server 110. This processing mode is also referred to as the offline client operational mode.

Some of the above listed functions, such as, for example, client request processing, load balancing, client authentication, authorization, file storage and retrieval, and/or billing, may be referred to as pertaining to the server-side functionality. Other functions, such as, for example, accepting user input, acquiring files over one or more communication interfaces, and/or rendering information on the display, may be referred to as pertaining to the client-side functionality. However, in certain implementations, the computer system 1000 may include one or more computers performing at least some of the server-side functionality pertaining to the server-side functionality and at least some of the functions pertaining to the client-side functionality. Hence, the client-side and server-side functionality designation as may be referenced herein is intended for illustration purposes having no bearing on operation of the components of the computer system 1000.

In certain implementations, the computer system 1000 may be configured to acquire files of various types over one or more communication interfaces of the mobile computing device 130. In one illustrative example, the mobile computing device 130 may be equipped with a still image camera which may be employed for acquiring still image files. In another example, the mobile computing device 130 may be equipped with a video camera which may be employed for acquiring video streams. In a further example, the mobile computing device 130 may be equipped with a microphone which may be employed for acquiring audio streams. In a further example, the mobile computing device 130 may be equipped with a keyboard or touch screen which may be employed for acquiring text files.

Responsive to acquiring a file, the mobile computing device 130 may store the file in a local memory of the mobile computing device. In one illustrative example, the mobile computing device 130 may store the file in a local file system residing in a local non-volatile memory. In another example, the mobile computing device 130 may store the file in a database residing in a local non-volatile memory.

Further responsive to acquiring the file, the mobile computing device 130 may transmit a copy of the file to one or more servers 110 executing server-side portions 120 of the file management application. One or more servers 110 may store the received file in a file system, a database, and/or or in any other repository of a suitable architecture.

Further responsive to acquiring the file, the mobile computing device 130 may produce a preview file derived from the acquired file. The preview file may have a size less than that of the base file. The preview file is intended to act as a proxy for the base file for the purposes of rendering the base file on the screen of the mobile computing device: unless specifically requested by the user to display base files, rather than preview files, the mobile computing device may, responsive to receiving a user interface command to display one or more files, display one or more preview files corresponding to the files requested by the user.

For an image file, the preview file may be provided, e.g., by a thumbnail image or other reduced size image, or a reduced resolution image. For a video file, the preview file may be provided, e.g., by a "trailer" comprising a subset of frames of the base video file. For an audio file, the preview file may be provided, e.g., by one or more parts of the base audio file. For a text file, the preview file may be provided by an abstract, a synopsis, or by other description of the base text file.

In certain implementations, the mobile computing device may produce the preview file locally. Alternatively, the mobile computing device may transmit the acquired file to an external server for processing, and may then receive the preview file from the external server. In one illustrative example, a server 110, responsive to receiving a base file from the mobile computing device 130 for storing in a server-based data repository, may process the file to produce a preview file, and transmit the preview file back to the mobile computing device 130.

The mobile computing device 130 may track access to the files stored on the mobile computing device and/or on the server 110. In one illustrative example, the mobile computing device 130 may store in the memory, for each file of the plurality of files acquired by the mobile computing device, a data structure 200 schematically illustrated by FIG. 2. The data structure 200 may include a file identifier 210, the file creation timestamp 212, the file access timestamp 214, and/or the total number of the file access operations 216. The information stored in the data structure may be used in identifying a candidate file to be removed from the local memory of the mobile computing device 130, as described in more details herein below.

The mobile computing device 130 may allocate a quota in the local memory (e.g., in one or more local file systems) for storing the files acquired by the mobile computing devices via one or more I/O interfaces. The mobile computing device 130 may eventually determine that the available local memory of the mobile computing device is insufficient to accommodate an attempted memory write operation (e.g., storing a newly acquired file in a local file system). In order to complete the attempted memory write operation, the mobile computing device 130 may select, based on a pre-defined selection criterion, one of the previously acquired files for removal from the file system, thus releasing the memory necessary to store the newly acquired file.

In one illustrative example, the mobile computing device may analyze the array of data structures 200 for the plurality of files stored in the local memory of the mobile computing device, to select the file having the minimum number of file access operations associated with it, based on the total number of the file access operations 216. In another example, the mobile computing device may analyze the array of data structures 200 for the plurality of files stored in the local memory of the mobile computing device, to select the least recently accessed file, based on the file access timestamp 214. In a further example, the mobile computing device may analyze the array of data structures 200 for the plurality of files stored in the local memory of the mobile computing device, to select the least recently acquired file, based on the file creation timestamp 212. In a further example, the mobile computing device may analyze the array of data structures 200 for the plurality of files stored in the local memory of the mobile computing device, to select a file satisfying two or more conditions, e.g., the least accessed file created no later than a given date.

In certain implementations, the mobile computing device 130 may select a file to be removed among the files of the same type as the newly acquired file. Alternatively, the mobile computing device 130 may select a file to be removed among the files having a size not less than that of the newly acquired file. In certain implementations, the mobile computing device 130 may select two or more files to be removed, having the total size not less than that of the newly acquired file.

Responsive to removing one or more selected files, the mobile computing device may complete the attempted memory write operation (e.g., storing a newly acquired file in the local memory). The mobile computing device may further append the array of structures 200 to include a data structure storing the creation and access timestamps and/or the access counter for the newly acquired file. The mobile computing device may further create and store in the local memory a preview file corresponding to the newly acquired file, as described in more details herein above.

The mobile computing device may eventually receive a user interface command requesting to perform an operation on a file that has previously been removed from the local memory. The mobile computing device may then present a corresponding preview file and/or, responsive to receiving a user interface command explicitly directed to the base file, retrieve the base file from the server on which the file has previously been stored. If the local file system does not have available space sufficient to accommodate the full size file being retrieved from the server, the mobile computing device may select one or more least accessed or least recently accessed files as described in more details herein above, and remove the files from the local file system.

Figure 3:
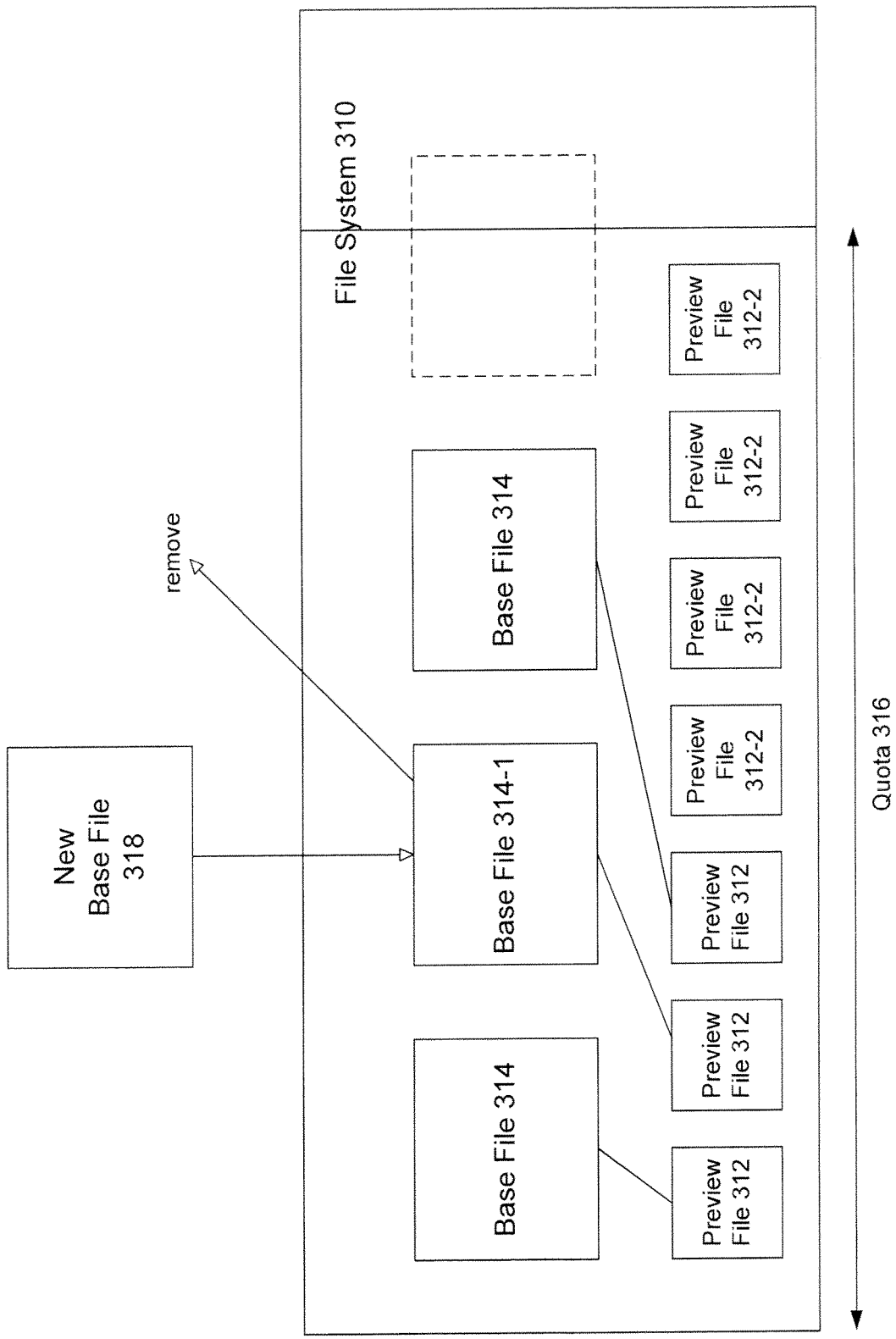
FIG. 3 schematically illustrates an example of the file management method in accordance with one or more aspects of the present disclosure.

Thus, as schematically illustrated by FIG. 3, the mobile computing device 130 may store in the local memory (e.g., in a local file system 310) preview files 312 for at least some of the files 314 acquired by the mobile computing device. The mobile computing device may further store full size versions of at least some of the files 314, to the extent that the full size files may be accommodated in the local memory of the mobile computing device. In one illustrative example, the mobile computing device may store, in a local file system 310 within a pre-defined quota 316, a plurality of preview files 312 corresponding to the base files 314. The mobile computing device may further store, in the local file system 310 within the pre-defined quota 316, a plurality of preview files 312-2 having no corresponding base files, since the base files corresponding to the preview files 312-2 could not be accommodated in the local file system 310 within the pre-defined quota 316.

A base file 314-1 may be removed from the file system in order to accommodate a newly acquired file 318, and a corresponding preview file 312-1 may be presented to a user responsive to a user interface command. The full size file 314-1 may be retrieved from a file server responsive to a user interface command explicitly directed to the full size file 314-1.

In certain implementations, the computer system 1000 may execute a calendar application facilitating event scheduling and tracking for individual users and/or groups of users. Users may access the calendar application by various client devices, including mobile computing devices 130.

In one example, the computer system 1000 may support a data model comprising calendar entries and memorandums, as schematically illustrated by FIG. 4. A calendar entry may be represented by a data structure 410 comprising an identifier 412 and a time 414. In certain implementations, the identifier 412 may be provided by a human readable sequence of alphanumeric characters comprising a title and/or description of a calendar entry. Alternatively, the calendar entry identifier may be provided by an alphanumeric or non-alphanumeric identifier which is not intended to be human-readable.

In certain implementations, the time 414 may be represented by a start time of an event identified by the calendar entry and duration of the event. Alternatively, the time 414 may be represented by a start time and end time of the event. The start time and/or end time of the event may be represented by a date (e.g., comprising a day, a month, and a year) and time of day (e.g., comprising an hour, a minute, and a second). The time 414 may further comprise a time zone identifier.

The data structure 410 may further comprise a calendar entry title 416, description 418, location 420, an identifier of an initiator 422 of the event identified by the calendar entry, a list of participants 424 of the event, recurring schedule 426, and/or other fields. In certain implementations, the data structure 410 may comprise a type identifier 411 of the calendar entry. Examples of calendar entries represented by the data structure 410 may include appointments, meeting requests, reminders, etc. In certain implementations, the data structure 410 may comprise one or more pointers 428 to data sets which may be referred to as attachments. In one example, an attachment may be provided by a file of an arbitrary type, such as text, audio stream, video stream, still image, etc.

A memorandum may be represented by a data structure 440 comprising a memorandum text 248. In certain implementations, the data structure 440 may further comprise a type identifier 441, a memorandum identifier 442, the time of creation and/or modification 444 of the memorandum, and/or a title 446 of the memorandum. The time 444 may be represented by a date (e.g., comprising a day, a month, and a year) and time of day (e.g., comprising an hour, a minute, and a second). The time 444 may further comprise a time zone identifier.

In certain implementations, the data structure 440 may comprise one or more pointers 450 to data sets which may be referred to as attachments. In one example, an attachment may be provided by a file of an arbitrary type, such as text, audio stream, video stream, still image, etc.

In certain implementations, the computer system 1000 may store the above referenced files and/or data structures in a relational database residing on one or more computers, including one or more servers 110 and/or one or more client devices 130. In certain implementations, other methods of storing the files and/or data structures implementing the above described data model may be employed by the computer system 1000, such as, e.g., a hierarchical database, or one or more flat files.

In certain implementations, the computer system 1000 may store a user directory associated with the calendar system in a directory server, such as a Lightweight Directory Access Protocol (LDAP) server. In certain implementations, other methods of storing the user directory, including, e.g., a native user directory provided by the operating system of a server 110, may be employed by the computer system 1000.

Upon receiving a user interface command, the computer system 1000 may render, on a client device, one or more calendar entries and/or memorandums via various views, including, e.g., calendar view and notebook view.

The calendar view may comprise one or more calendar entries rendered on a screen with visual references to one or more time indicators. In one example, as schematically illustrated by FIG. 5a, the calendar view 500 may comprise one or more week views 510. The week view 510 may comprise up to seven visually distinct screen areas corresponding to days of the week (day views 512). Each day view may be visually divided into several screen areas 514 corresponding to time of day. One or more time of day values may be placed within a day view. One or more calendar entries 516 may be shown within a day view 512. In another example, as schematically illustrated by FIG. 5b, the calendar view 500 may comprise one or more month views 520. The month view 520 may comprise a plurality of week views 510. The week view 510 may comprise up to seven visually distinct screen areas corresponding to days of the week (day views 512). Each day view may be visually divided into several screen areas 514 corresponding to time of day. One or more time of day values may be placed within a day view. One or more calendar entries 516 may be shown within a day view 512. In a further example, the calendar view may comprise quarter view, year view, and/or other views.

Figure 6A:
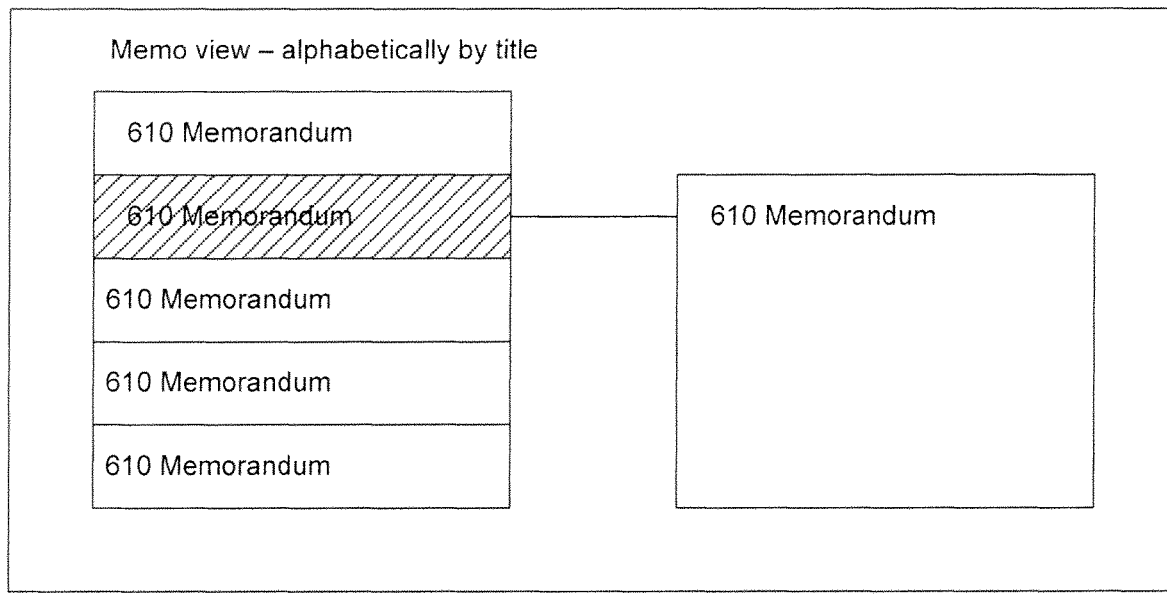
FIGS. 6a-6b schematically illustrate examples of notebook views rendered by the computer system executing a calendar application in accordance with one or more aspects of the present disclosure.
Figure 6B:
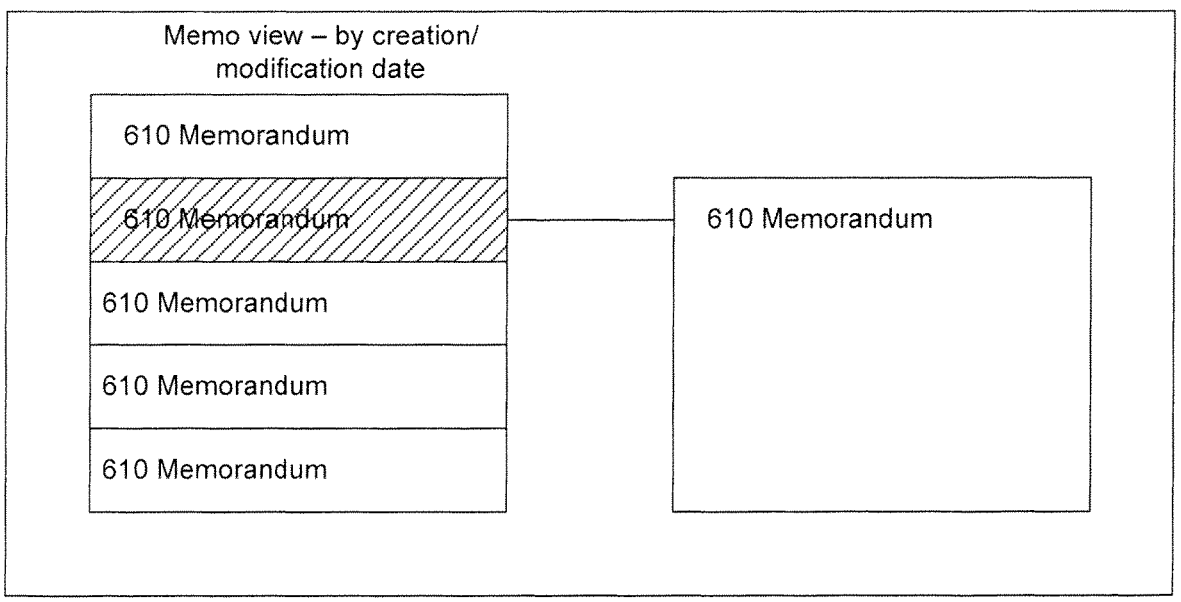

The notebook view may comprise one or more memorandums rendered on a screen. In one example, as schematically illustrated by FIG. 6a, one or more memorandums 610 rendered within the notebook view 600 may be sorted alphabetically by title/subject. In another example, as schematically illustrated by FIG. 6b, one or more memorandums rendered within the notebook view 600 may be sorted chronologically by the date of time of creation or modification of the memorandum.

In certain implementations, the computer system 1000 may render one or more calendar event and one or more memorandums in a mixed view, e.g., selecting and/or sorting calendar events and memorandums by title, keyword, author, and/or date and time of creation or modification of the calendar event or the memorandum.

In certain implementations, the computer system 1000 may accept a user input editing an existing calendar entry or an existing memorandum. In one example, responsive to accepting a user input editing a memorandum, the computer system 1000 may determine that the newly added text comprises a time reference. Following such a determination, the computer system 1000 may convert the memorandum into a calendar entry, and store in the calendar entry data structure the time identified by the time reference along with zero or more optional fields, as described in more details herein above.

Figure 7:
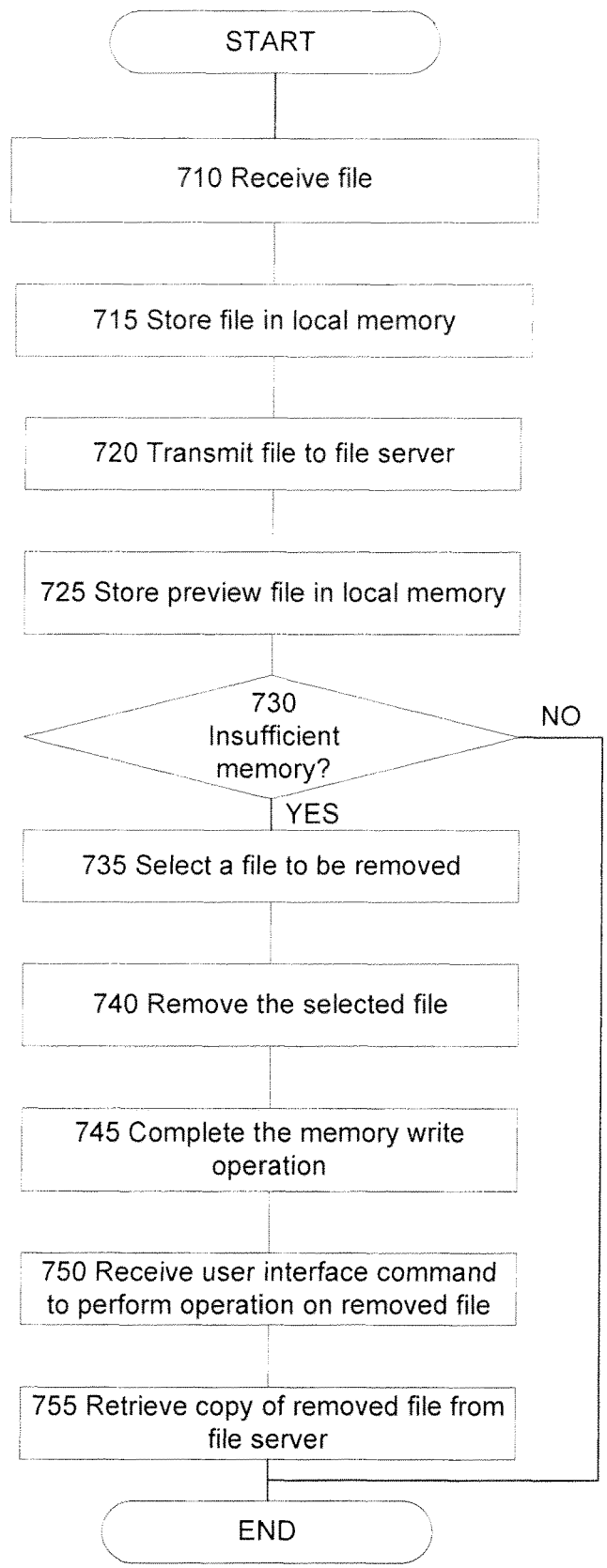
FIG. 7 depicts a flow diagram of a file management method, in accordance with one or more aspects of the present disclosure.

FIG. 7 depicts a flow diagram of one embodiment of a method 700 for file management by mobile computing devices. The method 700 may be performed by a computer system that may comprise hardware (e.g., circuitry, dedicated logic, and/or programmable logic), software (e.g., instructions executable on a computer system to perform hardware simulation), or a combination thereof. The method 700 and/or each of its individual functions, routines, subroutines, or operations may be performed by one or more physical processors of the computer system executing the method. Two or more functions, routines, subroutines, or operations of the method 700 may be performed in parallel or in an order which may differ from the order described above.

The processing may commence by the mobile computing device receiving, at block 710, a file via one or more I/O interfaces of the mobile computing device. In certain implementations, the mobile computing device may be configured to acquire files of various types: in one illustrative example, the mobile computing device may be equipped with a still image camera which may be employed for acquiring still image files; in another example, the mobile computing device may be equipped with a video camera which may be employed for acquiring video streams; in a further example, the mobile computing device may be equipped with a microphone which may be employed for acquiring audio streams; in a further example, the mobile computing device may be equipped with a keyboard or touch screen which may be employed for acquiring text files.

At block 715, the mobile computing device may store the file in a local memory of the mobile computing device. In one illustrative example, the mobile computing device 130 may store the file in a local file system residing in a local non-volatile memory. In another example, the mobile computing device may store the file in a database residing in a local non-volatile memory.

At block 720, the mobile computing device may transmit a copy of the file to one or more external computers (e.g., file servers executing server-side portions of the file management application).

At block 725, the mobile computing device may store in the local memory a second file (also referred to as a "preview" file) derived from the first file. The size of the preview file may be less than the size of the first file. For an image file, the preview file may be provided, e.g., by a thumbnail image or other reduced size image, or a reduced resolution image. For a video file, the preview file may be provided, e.g., by a "trailer" comprising a subset of frames of the base video file. For an audio file, the preview file may be provided, e.g., by one or more parts of the base audio file. For a text file, the preview file may be provided by an abstract, a synopsis, or by other description of the base text file. In certain implementations, the mobile computing device may produce the preview file locally. Alternatively, the mobile computing device may transmit the acquired file to an external server for processing, and may then receive the preview file from the external server.

Responsive to determining, at block 730, that the local memory is not sufficient to perform an attempted memory write operation, the processing may continue at block 735; otherwise the method may terminate. In certain implementations, the mobile computing device may allocate a quota in the local memory (e.g., in one or more local file systems) for storing the files acquired by the mobile computing devices via one or more I/O interfaces. The mobile computing device may eventually determine that the available local memory of the mobile computing device is insufficient to accommodate an attempted memory write operation (e.g., storing a newly acquired file in a local file system).

At block 735, the mobile computing device may select a third file, such that the third file has a fourth file associated with it, the fourth file being derived from the third file. In order to complete the attempted memory write operation, the mobile computing device may select, based on a pre-defined selection criterion, one of the previously acquired files for removal from the file system, thus releasing the memory necessary to store the newly acquired file. In one illustrative example, the mobile computing device may select the file having the minimum number of file access operations associated with it. In another example, the mobile computing device may select the least recently accessed file. In a further example, the mobile computing device may select the least recently acquired file. In a further example, the mobile computing device may select a file satisfying two or more conditions, e.g., the least accessed file created no later than a given date. In certain implementations, the mobile computing device may select a file to be removed among the files of the same type as the newly acquired file. Alternatively, the mobile computing device may select a file to be removed among the files having a size not less than that of the newly acquired file. In certain implementations, the mobile computing device may select two or more files to be removed, having the total size not less than that of the newly acquired file.

At block 740, the mobile computing device may remove the selected file from the local memory.

At block 745, the mobile computing device may complete the attempted memory write operation.

At block 750, the mobile computing device may receive a user interface command requesting to perform an operation on the third file.

At block 755, the mobile computing device may retrieve a copy of the third file from the server on which the file has previously been stored. If the local file system does not have available space sufficient to accommodate the full size file being retrieved from the server, the mobile computing device may select one or more least accessed or least recently accessed files as described in more details herein above, and remove the files from the local file system. Responsive to completing the operations references by block 755, the method may terminate.

Figure 8:
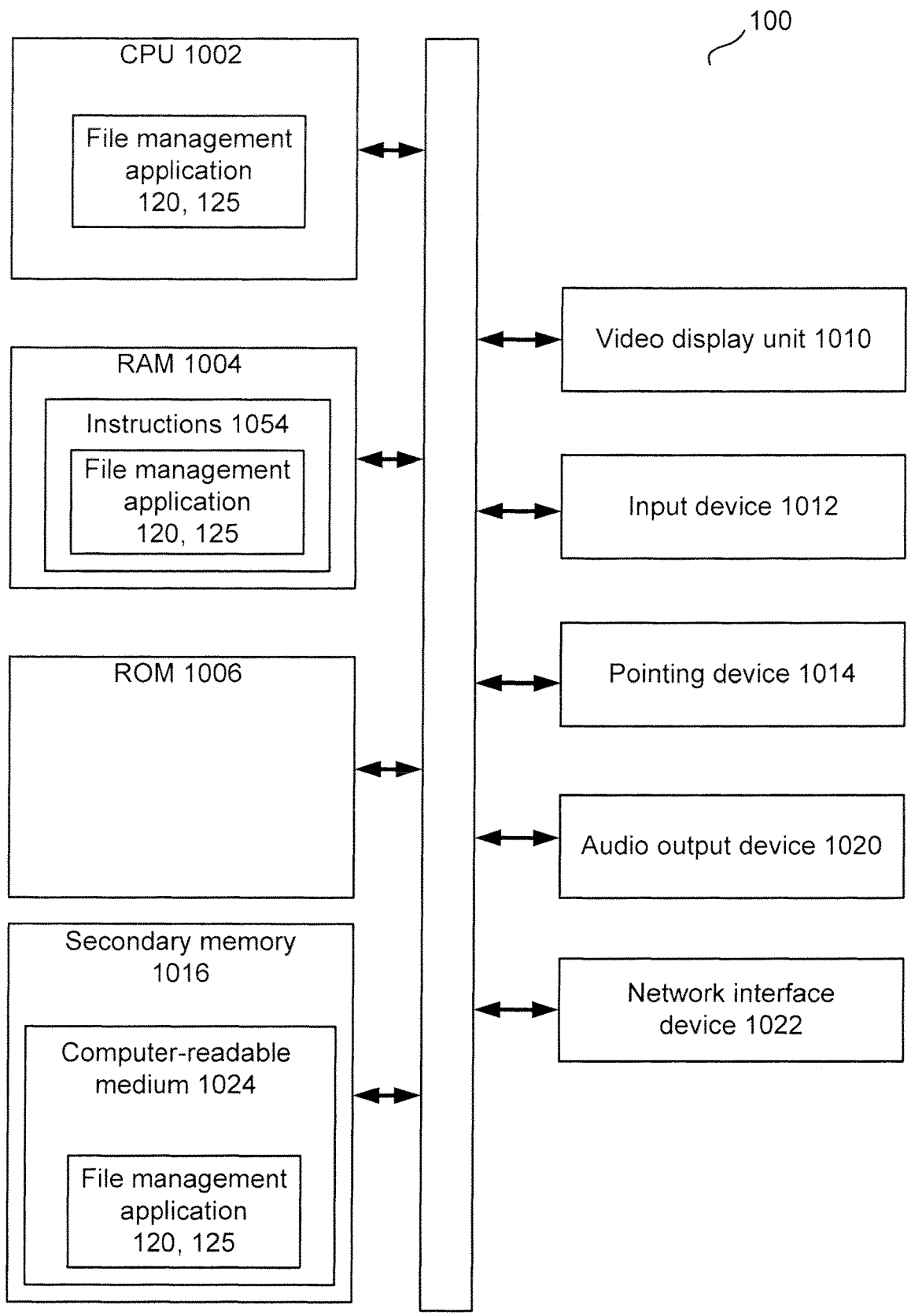
FIG. 8 depicts a block diagram of an illustrative computer system operating in accordance with examples of the present disclosure.

FIG. 8 depicts an example computer system 100 capable of executing instructions causing the computer to perform one or more of the methods described herein. In certain embodiments, the computer system 100 may correspond to one or more servers 110 and/or client devices of FIG. 1.

In certain embodiments, the computer system 100 may be connected (e.g., via a network, such as a Local Area Network (LAN), an intranet, an extranet, or the Internet) to other computer systems. The computer system 100 may operate in the capacity of a server or a client computer in a client-server environment, or as a peer computer in a peer-to-peer or distributed network environment. The computer system 100 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device.

In a further aspect, the computer system 100 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008. The processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 100 may further include a network interface device 1022. The computer system 100 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the file management applications 120, 125. Instructions of the file management applications 120, 125 may also reside, completely or partially, within the main memory 1004 and/or within the processor 1002 during execution thereof by the computer system 1000, hence, the main memory 1004 and the processor 1002 may also constitute machine-readable storage media. While the computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulate and transform data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

What is claimed is:

1. A method, comprising:
    storing, by a computer system, a plurality of base files in a memory;
    causing respective copies of the plurality of base files to be stored on an external storage device;
    storing, in the memory, a plurality of preview files, each preview file having been derived from a corresponding base file of the plurality of base files, wherein a size of each preview file is less than a size of the corresponding base file;
    selecting, among the plurality of base files, one or more base files, wherein the one or more base files comprise a first base file;
    removing the one or more base files from the memory;
    responsive to receiving a user interface command requesting a full size file corresponding to a preview file of the first base file, selecting, among the plurality of base files, a second base file which is a least recently accessed base file created on or before a specified date;
    removing the second base file from the memory; and
    retrieving a copy of the first base file from the external storage device.

2. The method of claim 1, wherein each base file is provided by one of: a still image file, a video file, an audio file, or a document file.

3. The method of claim 1, wherein each preview file is provided by at least part of a corresponding base file.

4. The method of claim 1, wherein each preview file is provided by a description of a corresponding base file.

5. The method of claim 1, wherein each preview file is provided by a subset of video frames of a corresponding base file.

6. The method of claim 1, wherein each preview file is provided by a reduced resolution image of a corresponding base file.

7. The method of claim 1, wherein selecting the second base file comprises selecting two or more files.

8. The method of claim 1, wherein storing each preview file comprises receiving the preview file via a communication interface responsive to transmitting a corresponding base file to an external server.

9. The method of claim 1, further comprising receiving the plurality of base files via one of: a still image camera, a video camera, a microphone, or a network interface.

10. The method of claim 9, wherein the memory write operation is represented by storing, in the memory, a newly acquired base file received by the computer system.

11. The method of claim 10, wherein the newly acquired base file is provided by one of: a still image file, a video file, an audio file, or a document file.

12. The method of claim 10, further comprising: receiving the newly acquired base file via an input/output interface.

13. The method of claim 10, further comprising: transmitting the newly acquired base file to an external server.

14. A system, comprising:
    a memory; and
    a processor coupled to the memory, the processor configured to:
        store a plurality of base files in the memory;
        cause respective copies of the plurality of base files to be stored on an external storage device;
        store, in the memory, a plurality of preview files, each preview file having been derived from a corresponding base file of the plurality of base files, wherein a size of each preview file is less than a size of the corresponding base file;
        select, among the plurality of base files, one or more base files, wherein the one or more base files comprise a first base file;
        remove the one or more base files from the memory;
        responsive to receiving a user interface command requesting a full size file corresponding to a preview file of the first base file, select, among the plurality of base files, a second base file which is a least recently accessed base file created on or before a specified date;
        remove the second base file from the memory; and
        retrieve a copy of the first base file from the external storage device.

15. The system of claim 14, wherein each base file is provided by one of: a still image file, a video file, an audio file, or a document file.

16. The system of claim 14, wherein each preview file is provided by one of: at least part of a corresponding base file, a description of a corresponding base file, a subset of video frames of a corresponding base file, or a reduced resolution image of a corresponding base file.

17. The system of claim 14, wherein storing each preview file comprises receiving the preview file via a communication interface responsive to transmitting a corresponding base file to an external server.

18. A non-transitory computer-readable storage medium comprising executable instructions that, when executed by a computer system, cause the computer system to:

store a plurality of base files in a memory;

cause respective copies of the plurality of base files to be stored on an external storage device;

store, in the memory, a plurality of preview files, each preview file having been derived from a corresponding base file of the plurality of base files, wherein a size of each preview file is less than a size of the corresponding base file;

select, among the plurality of base files, one or more base files, wherein the one or more base files comprise a first base file;

remove the one or more base files from the memory;

responsive to receiving a user interface command requesting a full size file corresponding to a preview file of the first base file, select, among the plurality of base files, a second base file which is a least recently accessed base file created on or before a specified date;

remove the second base file from the memory; and retrieve a copy of the first base file from the external storage device.

19. The non-transitory computer-readable storage medium of claim 18, wherein each base file is provided by one of: a still image file, a video file, an audio file, or a document file.

20. The non-transitory computer-readable storage medium of claim 18, wherein each preview file is provided by one of: at least part of a corresponding base file, a description of a corresponding base file, a subset of video frames of a corresponding base file, or a reduced resolution image of a corresponding base file.

* * * * *